(12) United States Patent
Greger et al.

(10) Patent No.: US 6,669,225 B2
(45) Date of Patent: Dec. 30, 2003

(54) INFANT RETENTION MEMBER FOR A STROLLER

(75) Inventors: Jeff G. Greger, Lititz, PA (US); Jesslyn E. Tankel, King of Prussia, PA (US)

(73) Assignee: Graco Children's Products Inc., Exton, PA (US)

( * ) Notice: Subject to any disclaimer, the term of this patent is extended or adjusted under 35 U.S.C. 154(b) by 161 days.

(21) Appl. No.: 09/969,141

(22) Filed: Oct. 3, 2001

(65) Prior Publication Data

US 2003/0062710 A1 Apr. 3, 2003

(51) Int. Cl.[7] ................................. B62B 7/12
(52) U.S. Cl. ................... 280/648; 280/650; 280/647; 280/658; 280/643; 280/642; 280/644
(58) Field of Search ................ 280/650, 647, 280/87.02, 657, 658, 648, 649, 643, 644, 639, 642

(56) References Cited

U.S. PATENT DOCUMENTS

| | | | | |
|---|---|---|---|---|
| 4,108,489 A | * | 8/1978 | Salzman | 297/37 |
| 4,157,839 A | * | 6/1979 | Lahti et al. | 280/642 |
| 4,426,113 A | * | 1/1984 | Schutz | 297/440.11 |
| 4,538,830 A | * | 9/1985 | Nakao et al. | 280/647 |
| 4,846,521 A | * | 7/1989 | Takahashi et al. | 296/77.1 |
| 5,201,535 A | * | 4/1993 | Kato et al. | 280/30 |
| 5,454,584 A | | 10/1995 | Haut et al. | |
| 5,605,409 A | | 2/1997 | Haut et al. | |
| 5,882,030 A | | 3/1999 | Haut | |
| 5,954,404 A | | 9/1999 | Suzuki | |
| 6,012,189 A | * | 1/2000 | Dudley | 5/655 |
| 6,139,046 A | * | 10/2000 | Aalund et al. | 280/642 |
| 6,220,620 B1 | * | 4/2001 | Harroun | 280/650 |
| 6,267,404 B1 | | 7/2001 | Yang et al. | |
| 2002/0033588 A1 | * | 3/2002 | Kaneko et al. | 280/560 |

FOREIGN PATENT DOCUMENTS

| | | | | |
|---|---|---|---|---|
| DE | 23 50 917 A1 | | 4/1975 | |
| GB | 0439933 A1 | * | 8/1991 | B62B/9/12 |
| GB | 2 324 510 A | | 10/1998 | |
| GB | 2324510 A | * | 10/1998 | B62B/7/12 |

OTHER PUBLICATIONS

Easy Comfort Advantage V Travel System, Evenflo Inc. Website (Evenflo Inc., 2001) 1 pp. http://www.evenflo.com/ep/on_go/ezcadvvts.phtml?nf , printed on Oct. 2, 2001.

* cited by examiner

Primary Examiner—Brian L. Johnson
Assistant Examiner—J. Allen Shriver
(74) Attorney, Agent, or Firm—Foley & Lardner

(57) ABSTRACT

A stroller includes a stroller frame and a seat assembly attached to the stroller frame. The seat assembly has a seat and a backrest extending from a back side of the seat. The stroller also includes an infant retention member having a main section mounted to the seat assembly. The retention member is movable between a stowed position and a use position. When the retention member is in the stowed position, the main section lies over the seat so that an infant sitting on the seat sits on the main section. When the retention member is in the use position, the main section stands substantially upright from the seat to block forward movement of an infant lying on the seat.

20 Claims, 5 Drawing Sheets

INFANT RETENTION MEMBER FOR A STROLLER

BACKGROUND OF THE INVENTION

The present invention generally relates to a stroller having an infant retention member for preventing an infant lying in the seating area of the stroller from rolling forward out of the stroller.

In many known child strollers and carriages, the backrest of the child seating area can be pivoted between a sitting position and a reclined or lying position. When the backrest is in the fully reclined position, the child can be laid down in the seating area.

If the stroller is equipped with a fully reclinable backrest, the stroller must have a child retention structure so that, in the event that the stroller is stopped abruptly, the child's forward movement is arrested, and the child remains in the seating area. One commercially available stroller includes a fabric extension that extends from the front of the seat portion of the seating area and that can be releasably attached to a child tray mounted to the stroller. The fabric extension, when attached to the child tray, closes off the front area of the stroller between the upper surface of the seat portion and the child tray. That fabric extension, along with the side panels and the backrest/canopy back, creates an enclosure to surround a child lying in the seating area. If the stroller is stopped abruptly and the child continues to move forward, the child's forward movement is arrested by the fabric extension, preventing the child from tumbling forward out of the stroller.

Although this type of fabric extension keeps the child in the stroller, use of such a fabric extension requires that the child tray stay mounted to the stroller. Many child caregivers, however, prefer to remove the child tray from the stroller, for example, when storage or travel space is a concern. Therefore, there is a need for a more versatile stroller equipped with a seat back recline feature and a child retention structure.

SUMMARY OF THE INVENTION

An embodiment of the invention relates to a seat assembly for a stroller. The seat assembly includes a seat and a backrest extending from a back side of the seat. The seat assembly further includes an infant retention member having a main section. The retention member is movable between a stowed position and a use position. When the retention member is in the stowed position, the main section lies over the seat so that an infant sitting on the seat sits on the main section. When the retention member is in the use position, the main section stands substantially upright from the seat to block forward movement of an infant lying on the seat.

The seat assembly can include left and right side panels that connect to left and right sides of the seat and the backrest. In such an embodiment, the retention member further can include left and right sections that extend from left and right sides of the main section and that are attached to the left and right side panels. The retention member can have a substantially U-shaped profile formed by the main section and the left and right sections. The left and right sections preferably are foldable to fit flush with the left and right side panels, respectively, when the retention member is in the stowed position.

The left and right sections each can be substantially triangular, with one side attached to the main section and another side attached to the respective left or right side panel. Each of the left and right sections can have a substantially right triangular shape with a hypotenuse side attached to the respective left or right side panel.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION OF THE PREFERRED EMBODIMENTS

Figure 1:
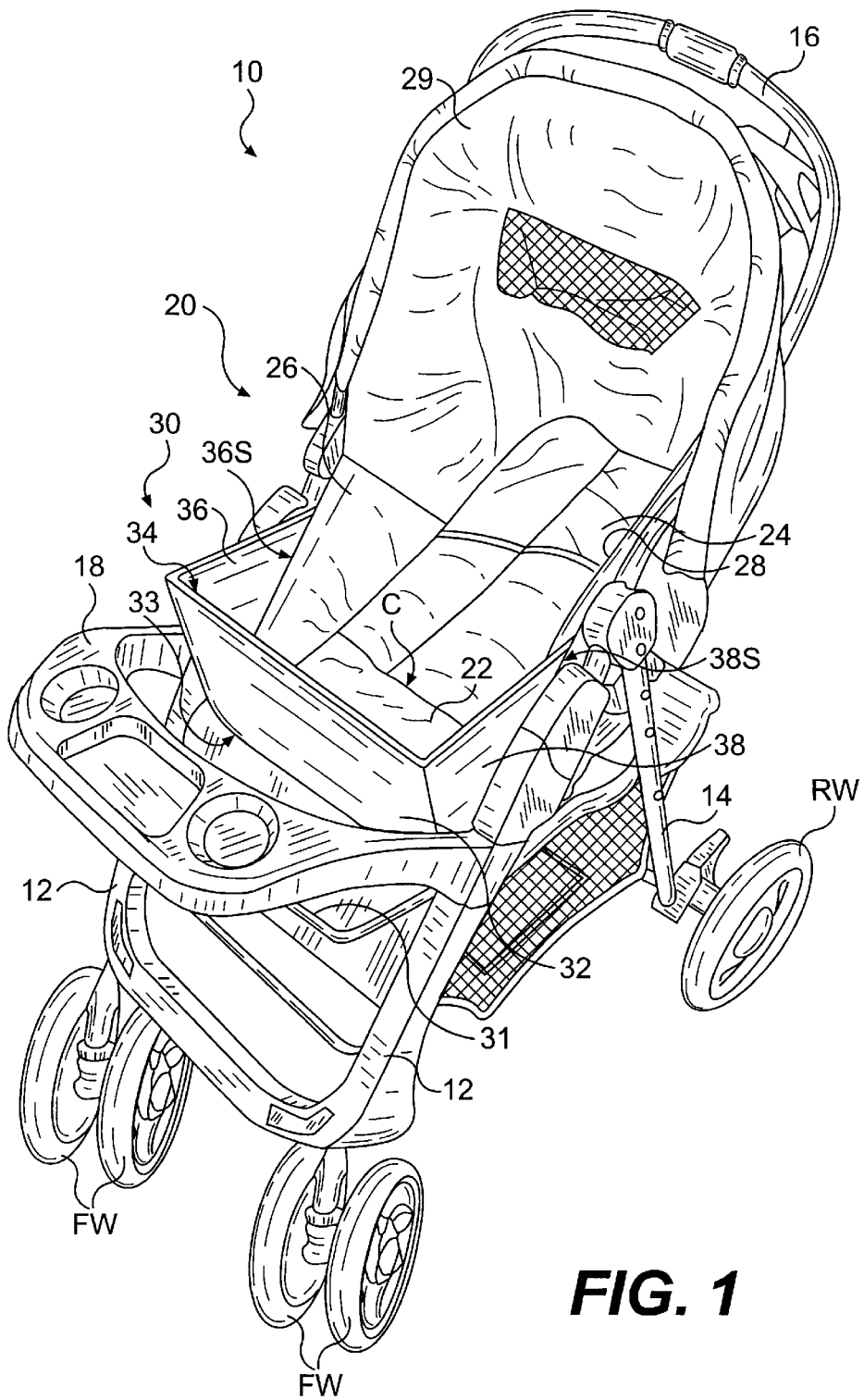
FIG. 1 is a perspective view of a stroller having an infant retention member in a use position in accordance with the invention.

FIG. 1 shows a conventional stroller 10 with an infant retention member 30 in accordance with the invention. The stroller 10 typically includes a forward carriage portion or seat assembly 20 attached to the stroller frame. The stroller frame includes first and second front legs 12, each attached to respective front wheel assemblies FW, and first and second rear legs 14, each attachable to respective rear wheel assemblies RW. A push bar 16 also forms part of the stroller frame. A child tray 18 can be releasably mounted to the front legs.

The seat assembly 20 includes a seat 22 and a backrest 24 extending at an angle from the rear side of the seat 22. The backrest 24 can be positioned in an upright position or in a plurality of intermediate reclined positions or in a fully reclined position, as shown in FIG. 1. When the backrest 24 is in the fully reclined position, the child caregiver may choose to position the child in the seat assembly 20 so that the child lies down on the seat 22 and the backrest 24. In this regard, the stroller 10 of the present invention includes an infant retention member 30 so that, if an infant is laid down on the seat 22 and the reclined seat back 24, and the stroller 10 is abruptly stopped, the infant retention member 30 will arrest the forward movement of the child.

Figure 2:
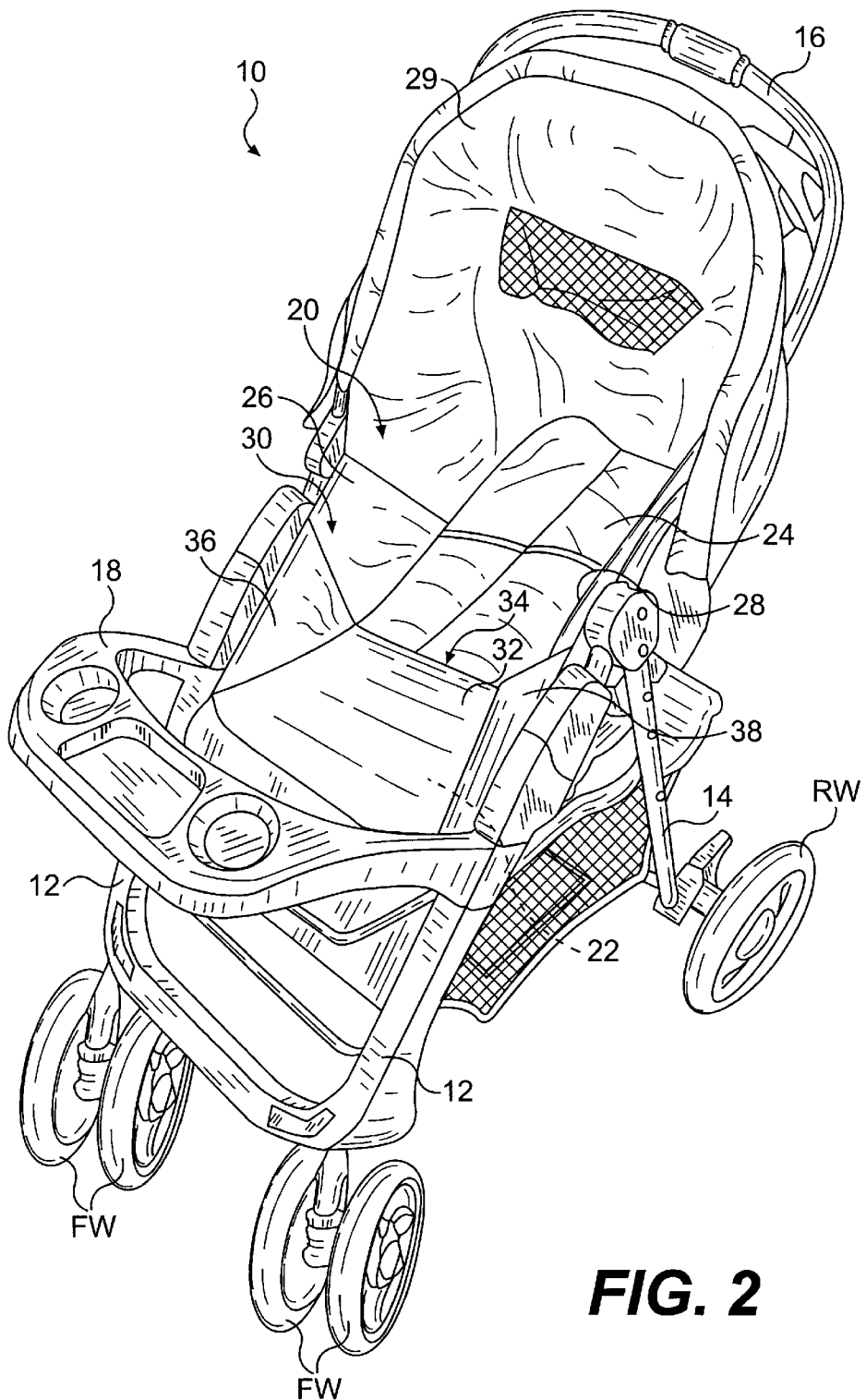
FIG. 2 is a perspective view of the stroller having an infant retention member in a stowed position.

The infant retention member 30 is movable between a stowed position, as shown in FIG. 2, and a use position, as shown in FIG. 1. The infant retention member 30 has a main section 32 mounted to an upper surface of the seat 22. The main section 32 can be mounted to the seat's upper surface at a location spaced from the front edge 31 of the upper surface, as shown in FIG. 1, or it can be mounted to the front edge 31 itself. A lower edge 33 of the main section 32 can be sewn to the fabric upper surface of the seat 22.

When the retention member 30 is in its stowed position, as shown in FIG. 2, the main section 32 of the retention member 30 lies over at least a portion of the seat 22. In the stowed position, the main section 32 can, but need not, fit flush against the upper surface of the seat 22. The main section 32 is configured so that an infant placed in the seat assembly 20 can sit on the main section 32 while the retention member 30 is stowed. When the retention member 30 is positioned in its use position, as shown in FIG. 1, the main section 32 stands substantially upright from the seat 22 to block forward movement of an infant lying on the seat 22 and reclined backrest 24.

According to one embodiment of the invention, the main section 32 is mounted to the seat 22 so that, when the infant retention member 30 is in its stowed position, a top edge 34 of the main section 32 is positioned at the crease C between the seat 22 and the backrest 24. Because the top edge 34 of the main section 32 is located at the crease C, the seat assembly 20 retains an aesthetically pleasing look, and the main section 32 does not reach and, hence, interfere with the angular positioning of, the backrest 24.

In addition to the seat 22 and the seatback 24, the seat assembly 20 typically includes left and right side panels 26, 28. The seat assembly also can include a canopy 29, which is formed as a continuum of the side panels 26, 28 and is attached to the backrest 24. The panels 26, 28 can be flexible and can connect to left and right sides of both the seat 22 and the backrest 24. Likewise, the infant retention member 30 can include left and right sections 36, 38. The left and right sections 36, 38 extend from the left and right sides of the main section 32, and these left and right sections 36, 38 are attached to the left and right side panels 26, 28 of the seat assembly. The left and right sections 36, 38 of the infant retention member 30 are foldable to stowed positions, as will be explained below in connection with FIGS. 3–5, to fit flush with the left and right side panels 26, 28 of the seat assembly 20.

The seat 22, the backrest 24, the side panels 26, 28, the canopy 29, and the retention member 30 define an enclosed seating area. When the retention member 30 is in the use position, the retention member 30 effectively closes off the front of the seating area so that, when an infant is laid down in the seating area, the infant cannot roll or slide off of the seat 22.

In preferred embodiment, the left and right sections 36, 38 of the retention member 30 each are substantially triangular, and the main section 32 is substantially rectangular. In this regard, the main section 32 and the right and left side sections 36, 38 of the retention member 30 can have a substantially U-shaped profile, as seen best in FIGS. 1 and 4. One side of each section 36, 38 is attached to the main section 32, and another side of each section 36, 38 is attached to the respective right and left panel 26, 28. The right and left sections 36, 38 preferably have a substantially right triangular shape with its hypotenuse side 36S, 38S attached to the right and left panels 26, 28.

The main section 32 and left and right sections 36, 38 of the infant retention member 30 can be formed of fabric or soft goods. Alternatively, the sections 32, 36, 38 can be formed by a semi-rigid panel or sheet wrapped in fabric and cut to the appropriate dimensions. The sheets can be formed of, for example, a plastic, a nylon, a mesh, or other materials known and used in the stroller art. Further, infant retention sections 32, 36, 38 can be color coordinated with the other seat assembly components as selected by the designer and manufacturer.

In an alternative embodiment, since the main section 32 is attached to the side panels 26, 28 via the right and left sections 36, 38 of the retention member, the main section 32 of the infant retention member 30 need not be attached to the seat 22. In this alternative embodiment, the main section 32 can be indirectly secured to the stroller via the attachment of the left and right sections 36, 38 to the left and right side panels 26, 28 of the stroller. When the infant retention panel 30 is in its use position in this alternative embodiment, only a small gap (too small to permit the passage of an infant therethrough) would be formed between the lower edge of the main section 32 and the upper surface of the seat 22. According to another alternative embodiment, the main section 32 can be attached to the seat 22 using releasable fasteners, such as snaps, zippers, or fabric adhesive, provided that the right and left sections 36, 38 of the infant retention member 30 are permanently attached.

Figure 3:
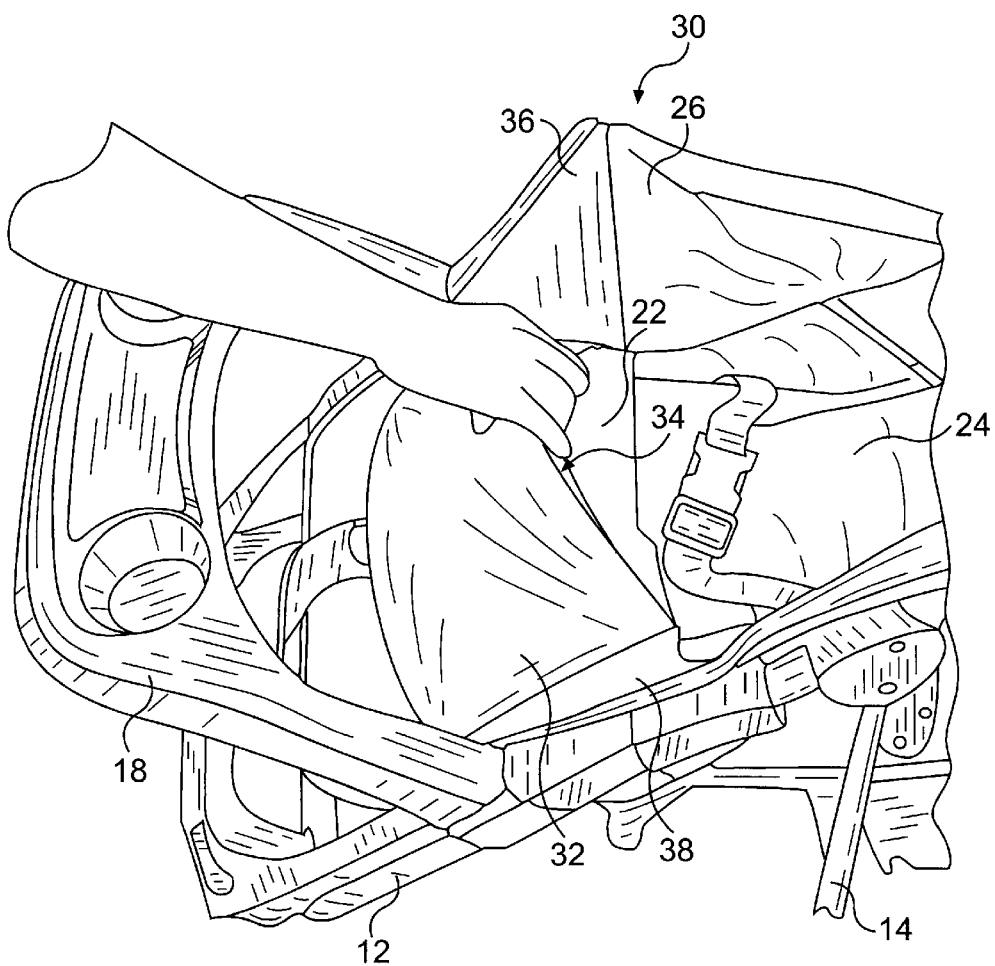
FIG. 3 is an enlarged perspective view of the infant retention member being moved from its stowed position to its use position.

A method of converting the infant retention member 30 between the stowed position and the use position will now be described in connection with FIGS. 3–5. As seen in FIG. 3, the child caregiver can grasp the top edge 34 of the main section 32 and can pull it away from its position against seat 22. Once the main section 32 has been pulled a sufficient distance away from the seat 22, the right and left sections 36, 38 will follow the movement of the main section 32 and lift away from the right and left panels 26, 28 into the use position shown in FIG. 4. When the child caregiver is ready to fold the retention member 30 back to its stowed position, the child caregiver can push downward on the main section 32 and then push downward on each of the left and right sections 36, 38 until all three sections 32, 36, 38 are flush against the seat 22 and left and right panels 26, 28, respectively.

Figure 4:
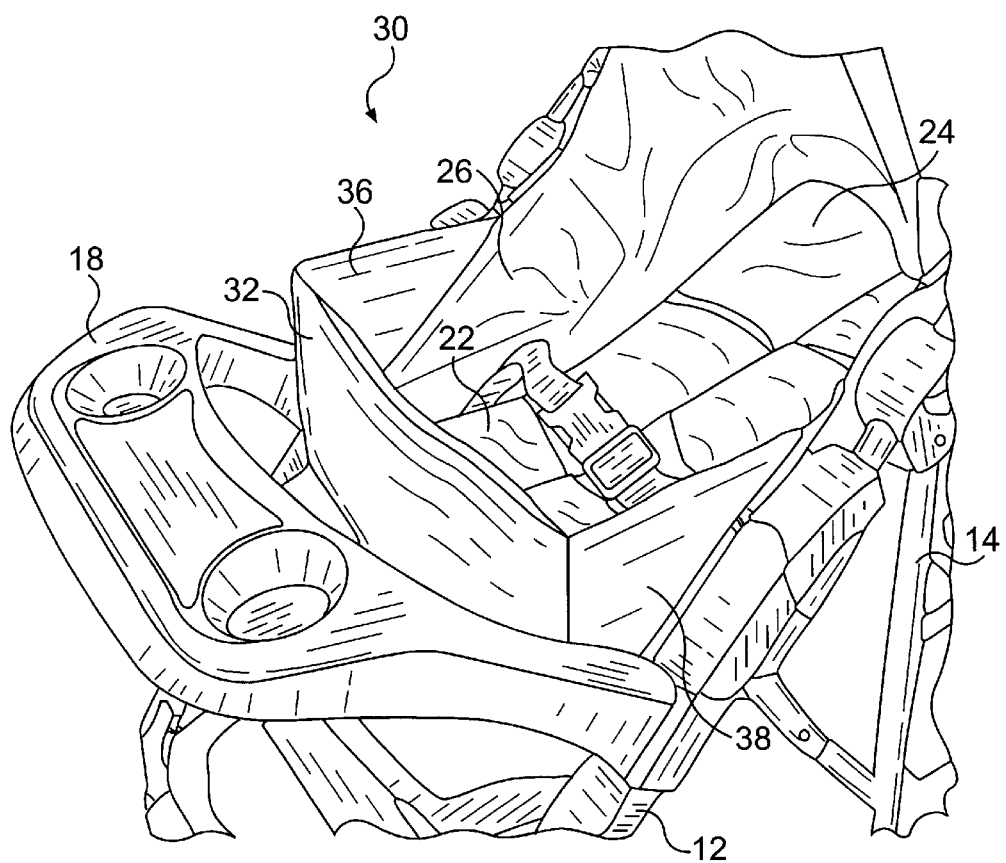
FIG. 4 is an enlarged perspective view of the infant retention member in its use position.
Figure 5:
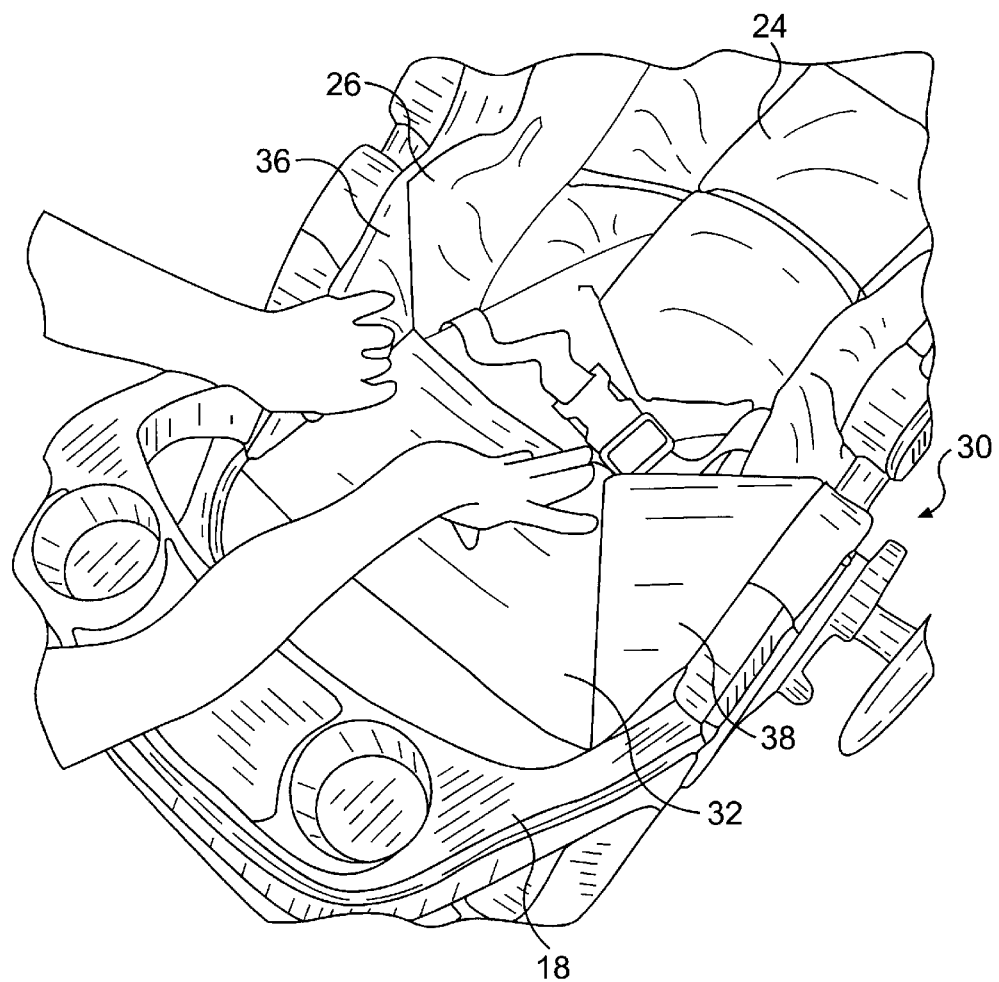
FIG. 5 is an enlarged perspective view of the infant retention member being moved from its use position to its stowed position.

As can be seen from FIGS. 3–5, the infant retention member 30 is not dependent on the child tray 18 to hold the retention member 30 in its use position. The retention member 30 is mounted on the seat 22 at a position between the child tray 18 and the seat back 24. Thus, the child caregiver can remove the child tray 18 from the stroller 10 and still use the retention member 30.

An infant retention member of seat assembly for a stroller has been described according to the present invention. Modifications and variations may be made to the infant retention member, seat assembly, and stroller described and illustrated herein without departing from the spirit and scope of the invention. Accordingly, it should be understood that the structures described herein are illustrative only and are not limiting upon the scope of the invention.

What is claimed is:

1. A seat assembly for a stroller, comprising:
   a seat and a backrest extending from a back side of the seat; and
   an infant retention member having a main section, the retention member being movable between a stowed position and a use position,
   wherein the main section lies over at least a portion of the seat when the retention member is in the stowed position so that an infant sitting on the seat sits on the main section, and
   wherein the main section stands substantially upright from the seat when the retention member is in the use position to block forward movement of an infant lying on the seat.

2. A seat assembly according to claim 1, further including left and right side panels that connect to left and right sides of the seat and the backrest, and wherein the retention member further includes left and right sections that extend from left and right sides of the main section and that are attached to the left and right side panels.

3. A seat assembly according to claim 2, wherein the left and right side panels are flexible.

4. A seat assembly according to claim 2, wherein the left and right sections are foldable to fit flush with the left and right side panels, respectively, when the retention member is in the stowed position.

5. A seat assembly according to claim 2, wherein the retention member has a substantially U-shaped profile.

6. A seat assembly according to claim 2, wherein the left and right sections each are substantially triangular, with one side attached to the main section and another side attached to the respective left or right side panel.

7. A seat assembly according to claim 6, wherein each of the left and right sections has a substantially right triangular shape with a hypotenuse side attached to the respective left or right side panel.

8. A stroller comprising:
a stroller frame; and
a seat assembly attached to the stroller frame, the seat assembly having a seat and a backrest extending from a back side of the seat,
an infant retention member having a main section mounted to the seat assembly,
wherein the retention member is movable between a stowed position and a use position,
wherein the main section lies over at least a portion of the seat when the retention member is in the stowed position so that an infant sitting on the seat sits on the main section, and
wherein the main section stands substantially upright from the seat when the retention member is in the use position to block forward movement of an infant lying on the seat.

9. A stroller according to claim 8, wherein the seat assembly further includes left and right side panels that connect to left and right sides of the seat and the backrest, and wherein the retention member further includes left and right sections that extend from left and right sides of the main section and that are attached to the left and right side panels.

10. A stroller according to claim 9, wherein the left and right side panels are flexible.

11. A stroller according to claim 9, wherein the left and right sections are foldable to fit flush with the left and right side panels, respectively, when the retention member is in the stowed position.

12. A stroller according to claim 9, wherein the retention member has a substantially U-shaped profile.

13. A stroller according to claim 9, wherein the left and right sections each are substantially triangular, with one side attached to the main section and another side attached respective left or right side panel.

14. A stroller according to claim 13, wherein each of the left and right sections has a substantially right triangular shape with a hypotenuse side attached to the respective left or right side panel.

15. An infant retention member mountable to a seat assembly of a stroller having a seat and a backrest extending from a back side of the seat, comprising:
a main section movable between a stowed position and a use position,
wherein the main section is adapted to lie over at least a portion of the seat when the retention member is in the stowed position so that an infant sitting on the seat sits on the main section, and
wherein the main section is adapted to stand substantially upright from the seat when the retention member is in the use position to block forward movement of an infant lying on the seat.

16. An infant retention member according to claim 15, wherein the retention member further includes left and right sections that extend from left and right sides of the main section, the left and right sections being adapted to attach to left and right side panels of the seat assembly connecting left and right sides of the seat and the backrest.

17. An infant retention member according to claim 16, wherein the left and right sections are foldable to fit flush with the left and right side panels when the retention member is in the stowed position.

18. An infant retention member according to claim 16, wherein the retention member has a substantially U-shaped profile.

19. An infant retention member according to claim 16, wherein the left and right sections each are substantially triangular, with one side attached to the main section and another side adapted to be attached to the respective left or right side panel.

20. A stroller according to claim 19, wherein each of the left and right sections has a substantially right triangular shape with a hypotenuse side adapted to be attached to the respective left or right side panel.

* * * * *